Jan. 8, 1946.  J. C. WEBER, JR  2,392,561
MOLD FOR GLASSWARE
Filed June 18, 1943   2 Sheets-Sheet 1
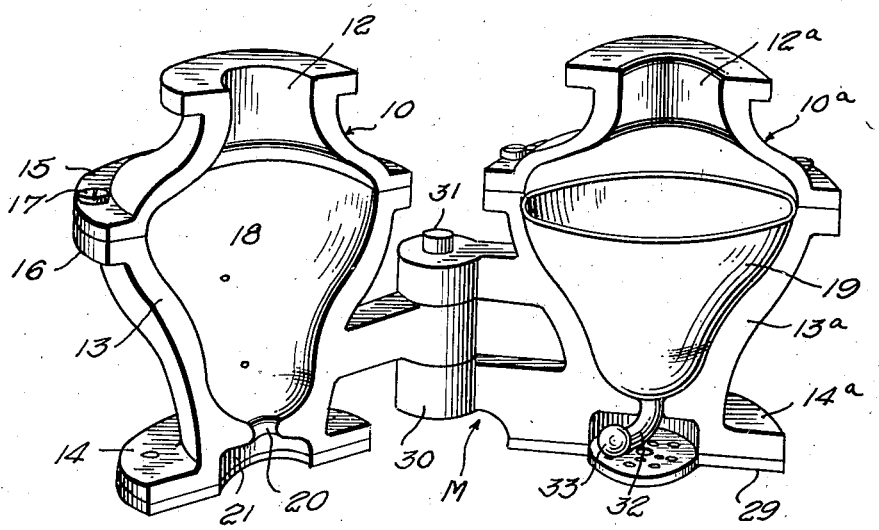
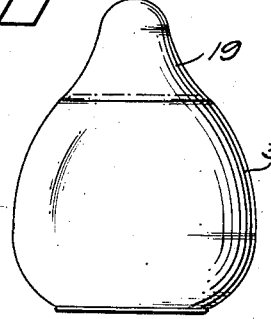
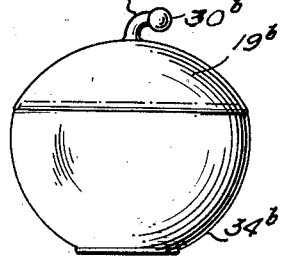
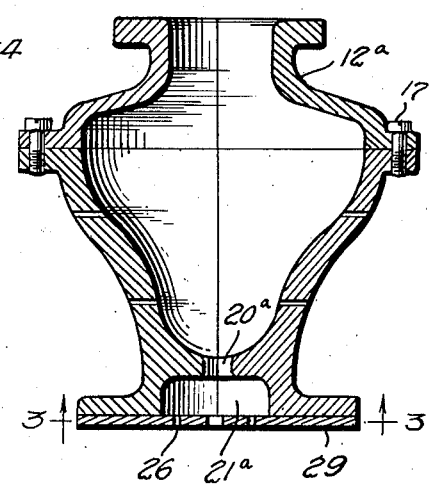
Inventor
JOHN C. WEBER JR.
By George E. Cook
Attorney Jan. 8, 1946.   J. C. WEBER, JR   2,392,561
MOLD FOR GLASSWARE
Filed June 18, 1943   2 Sheets-Sheet 2
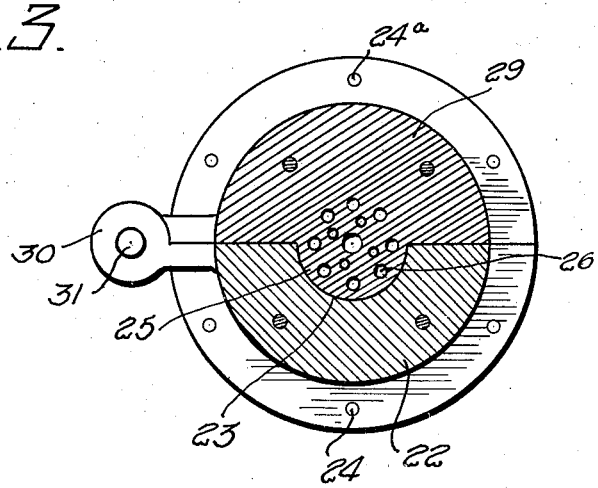
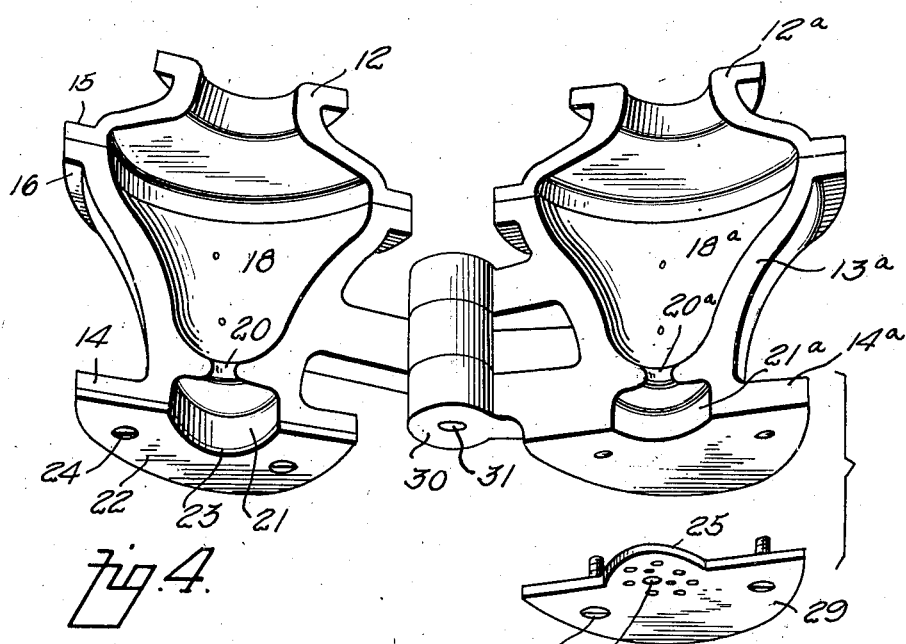
Inventor
JOHN C. WEBER JR.
By George E. Cook
Attorney Patented Jan. 8, 1946

2,392,561

UNITED STATES PATENT OFFICE 2,392,561

MOLD FOR GLASSWARE

John C. Weber, Jr., Weston, W. Va., assignor to West Virginia Glass Specialty Company, Incorporated, Weston, W. Va., a corporation of West Virginia Application June 18, 1943, Serial No. 491,357

3 Claims. (Cl. 49—71)

The instant invention relates to molds and more particularly to a mold for glass articles and the like.

One of the primary objects of the invention is the construction of a mold for glass articles having special provision for the production of a glass lid, cover or the like for the article.

Still a further aim is the molding in a single operation of a lid for a glass article such as a bowl or the like, in which the lid has a curved stem constituting a handle for said lid.

Yet another purpose is the molding in a single operation of a glass cover which is fashioned with a curved stem terminating in a ball, said stem and ball constituting a handle for the cover.

Another object is the fabrication of a mold having a small, lower chamber for the formation of a curved stem having a terminal ball portion, said stem and ball constituting a handle for a glass lid or cover.

The above and other aims and objects will be apparent from the detailed description hereinafter appearing when taken in conjunction with the appended drawings in which Fig. 1 is a perspective view of a two-part hinged mold embodying the invention, said mold being open to show a glass lid having a curved stem at the completion of the molding operation;

Fig. 2 is a vertical sectional view through one of the mold sections;

Fig. 3 is a sectional view taken on line 3—3 of Fig. 2;

Fig. 4 is a view similar to Fig. 1, but taken with the two-part mold slightly inclined to the horizontal and with a plate portion of one of the mold sections in position for attachment;

Fig. 5 is an elevational view of a pear-shaped glass bowl and a lid therefor, the latter having been molded in accordance with the instant invention; and Fig. 6 is a view similar to Fig. 5, but of a glass bowl and lid together shaped to resemble an apple.

Heretofore, glass lids for glassware have been made in which said lids were equipped with glass stems constituting handles. In many instances these stems were curved and the making of such curved stems involved substantially the following procedure. The glass lid was molded with a straight stem and after removal from the mold, the stem was heated to soften same followed by curving into shape. The additional steps of reheating and curving were both time consuming and expensive and it is the primary purpose of the instant invention to substitute for the above steps a single operation which will produce a glass lid with a curved stem without the necessity of reheating and bending.

Referring to the drawings, the reference character M designates a glass mold in its entirety, formed of hinged mold sections 10 and 10ª. Mold section 10 comprises a removable apertured top portion 12, body portion 13 and a horizontally extending base portion 14. Top portion 12 is provided with a semi-circular horizontal flange 15 resting on a similar flange 16 defining the upper part of body portion 13. Removable screws 17 passing through the flanges connect the top and body sections. The internal surface 18 of the body section is given a shape to produce with the other mold section 10ª a lid of a predetermined design, in this instance, a glass lid 19 having a bell-shape. A narrow passageway 20 leads from the internal surface of body portion 13 to a lower semi-circular chamber portion 21 for a purpose which will shortly appear. A base plate 22 having a semi-circular cutaway portion 23 is removably secured as by screws 24 to the base plate 14.

Mold section 10ª is substantially of the same construction as mold section 10 having a top portion 12ª, body portion 13ª, a horizontally extending base portion 14ª, internal surface 18ª, a narrow passageway 20ª leading from internal surface 18ª to a lower semi-circular chamber portion 21ª. A base plate 29 having a semi-circular lip 25 the plate being apertured as at 26, is secured to base plate 14ª as by screws 24ª. In the closed position of the mold the lip 25 fits within the semi-circular cutaway portion 23 of the plate 22 as shown in Fig. 3 of the drawings.

As will be evident from Figs. 1 and 4 the mold sections 10 and 10ª are hingedly secured together by a structurally integral hinge 30 having a hinge pin 31.

In the use of the mold the molten glass is taken from the tank by the gatherer, shaped on an iron plate and handed to the blower who has a pair of tools with which he forms the ball 33 and the stem 32. The latter is straight when placed in the left side 18 of the mold of Figure 1. Now when the mold is closed the lip 25 of plate 29 contacts and curves the stem and forces the ball and stem into the chamber 21. Finally the rest of the lid is shaped by rotating the molten glass within the mold. During this operation the curved stem 32 extends through the passageway 20, 20ª. The apertures 26 in the base plate 29 serve to quickly cool the curved stem 32 whereby the latter may be rotated in the annular chamber formed by the chamber portions 21, 21ᵃ. After completion of the shaping operation the mold is opened and the glass lids 19 removed as best illustrated in Fig. 1 of the drawings.

It will be understood that glass lids having various shapes depending upon the shape of the mold may be produced by the practice of the instant invention. The lid 19 as indicated is bell-shaped for use with a bowl 34 shown in Fig. 5 to form a pear-shaped vessel. In Fig. 6 there is shown a lid 19ᵇ having a curved stem 32ᵇ terminating in a ball portion 30ᵇ for use with a bowl 34ᵇ to form an apple-shaped vessel. No matter what shape lid is formed each is molded with a curved stem as set forth hereinbefore. Also the size of the lid is controlled by the size of the mold and the length and size of the curved stem determined by the depth and diameter of the annular chamber formed by chamber sections 21, 21ᵃ.

While the invention has been described in detail various changes will be apparent to those skilled in the art, and it is contemplated to cover all such and to be limited in this respect only as may be necessary by the scope of the claims hereto appended.

What I claim and desire to secure by Letters Patent is:

1. A glass mold comprising hinged mold sections, each section having a top portion, body portion and a base, said base having a semicircular chamber portion, a narrow passageway connecting said chamber portion with the inner surface of the body portion, an apertured plate having a projecting lip secured to the base of one of said sections, the apertures in said plate being located below said chamber portion.

2. A glass mold comprising hinged mold sections, each section having a top portion, body portion and a base, said base having a semicircular chamber portion, a narrow passageway connecting said chamber portion with the inner surface of the body portion, one of said sections having a plate secured to its base, said plate having a cut-out portion defining one edge thereof, the other section having an apertured plate secured to its base, said apertured plate having a lip fitting into said cut-out portion in the closed position of the mold.

3. A glass mold comprising hinged mold sections, each section having a top portion, body portion and a base, said base having a semicircular chamber portion, a narrow passageway connecting said chamber portion with the inner surface of the body portion, one of said sections having a plate secured to its base, said plate having a cut-out portion defining one edge thereof, the other section having an apertured plate secured to its base, said apertured plate having a lip fitting into said cut-out portion in the closed position of the mold, the apertures in said plate being located below said chamber portion.

JOHN C. WEBER, Jr.